United States Patent
Chang

(10) Patent No.: US 10,637,228 B2
(45) Date of Patent: Apr. 28, 2020

(54) SYSTEM ELECTROSTATIC DISCHARGE CIRCUIT

(71) Applicant: Nuvoton Technology Corporation, Hsinchu (TW)

(72) Inventor: Pao-Shu Chang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 354 days.

(21) Appl. No.: 15/860,674

(22) Filed: Jan. 3, 2018

(65) Prior Publication Data
US 2019/0074679 A1 Mar. 7, 2019

(30) Foreign Application Priority Data
Sep. 7, 2017 (TW) .............................. 106130587 A

(51) Int. Cl.
*H02H 1/00* (2006.01)
*H02H 9/00* (2006.01)
*H02H 9/04* (2006.01)

(52) U.S. Cl.
CPC ........ *H02H 1/0007* (2013.01); *H02H 1/0061* (2013.01); *H02H 9/005* (2013.01); *H02H 9/04* (2013.01); *H02H 9/042* (2013.01)

(58) Field of Classification Search
CPC .... H02H 1/0007; H02H 1/0061; H02H 9/005; H02H 9/04; H02H 9/042
USPC .......................................................... 361/56
See application file for complete search history.

(56) References Cited

U.S. PATENT DOCUMENTS

| 2002/0039270 A1* | 4/2002 | Sato ...................... H02H 9/042 361/93.1 |
| 2005/0190514 A1* | 9/2005 | Walters ................. H01L 29/868 361/56 |
| 2012/0007138 A1* | 1/2012 | Nguyen .............. H01L 27/0251 257/134 |

FOREIGN PATENT DOCUMENTS

| TW | 200515578 | 5/2005 |
| TW | 201222780 | 6/2012 |
| TW | 201619777 | 6/2016 |
| TW | 201635662 | 10/2016 |

OTHER PUBLICATIONS

"Office Action of Taiwan Counterpart Application", dated Jul. 4, 2018, p. 1-p. 3.

* cited by examiner

*Primary Examiner* — Kevin J Comber
(74) *Attorney, Agent, or Firm* — JCIPRNET

(57) ABSTRACT

A system electrostatic discharge circuit is provided. The system electrostatic discharge circuit includes a first transient voltage suppressor diode and a first resistance element. The first resistance element and the first transient voltage suppressor diode are coupled in series between a first power line and a second power line. In addition, a resistance value of the first resistance element is proportional to a sum of currents flowing through the first resistance element.

7 Claims, 2 Drawing Sheets

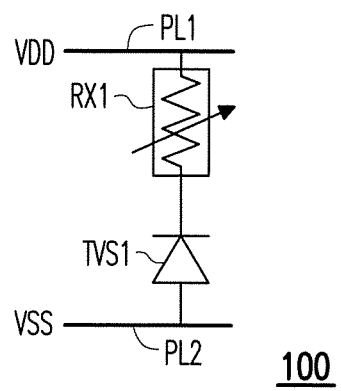
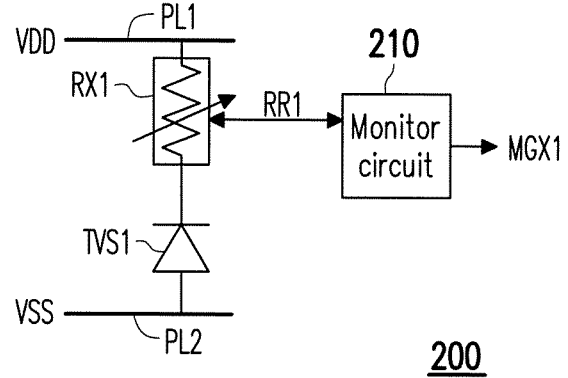
FIG. 1   FIG. 2
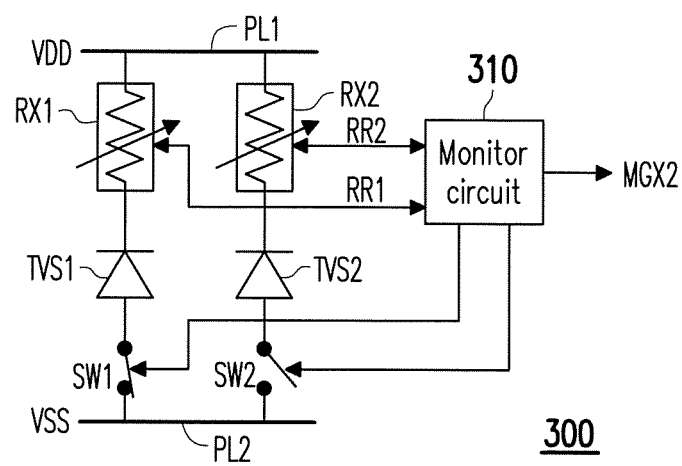
FIG. 3

SYSTEM ELECTROSTATIC DISCHARGE CIRCUIT

CROSS-REFERENCE TO RELATED APPLICATION

This application claims the priority benefit of Taiwan application no. 106130587, filed on Sep. 7, 2017. The entirety of the above-mentioned patent application is hereby incorporated by reference herein and made a part of this specification.

BACKGROUND OF THE INVENTION

1. Field of the Invention

The invention relates to an electrostatic discharge (ESD) circuit, and particularly relates to a system electrostatic discharge circuit.

2. Description of Related Art

For electronic apparatuses, electrostatic discharge (ESD) may cause permanent damage to semiconductor devices and computer systems and thus affect circuit functions of integrated circuits (ICs). As a result, electronic products may not be able to work normally. Therefore, electrostatic discharge protection circuits are commonly disposed in electronic apparatuses to suppress the influence of electrostatic discharge. However, based on the circuit design and properties of electronic devices, different electrostatic discharge protection circuits may have different levels of endurance. Thus, when the level of endurance is exceeded, the electrostatic discharge protection circuit may malfunction and is thus unable to protect the electronic apparatuses against electrostatic discharge.

SUMMARY OF THE INVENTION

The invention provides a system electrostatic discharge circuit capable of determining whether a transient voltage suppressor diode needs to be replaced by recording a state of use (i.e., a breakdown state) of the transient voltage suppressor diode with a resistance element. Accordingly, the safety of the system electrostatic discharge circuit is facilitated.

A system electrostatic discharge circuit according to an embodiment of the invention includes a first transient voltage suppressor diode and a first resistance element. The first resistance element and the first transient voltage suppressor diode are coupled in series between a first power line and a second power line. In addition, a resistance value of the first resistance element is proportional to a sum of currents flowing through the first resistance element.

Based on the above, in the system electrostatic discharge circuit according to the embodiments of the invention, since the resistance value of the first resistance element reflects the sum of currents of the first resistance element, the number of times of breakdown (or the total time of breakdown) of the first transient voltage suppressor diode can be learned, so as to determine whether the first transient voltage suppressor diode needs to be replaced. Hence, the safety of the system electrostatic discharge circuit is facilitated.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic circuit diagram illustrating a system electrostatic discharge circuit according to a first embodiment of the invention.

FIG. 2 is a schematic circuit diagram illustrating a system electrostatic discharge circuit according to a second embodiment of the invention.

FIG. 3 is a schematic circuit diagram illustrating a system electrostatic discharge circuit according to a third embodiment of the invention.

DESCRIPTION OF THE EMBODIMENTS

Figure 4:
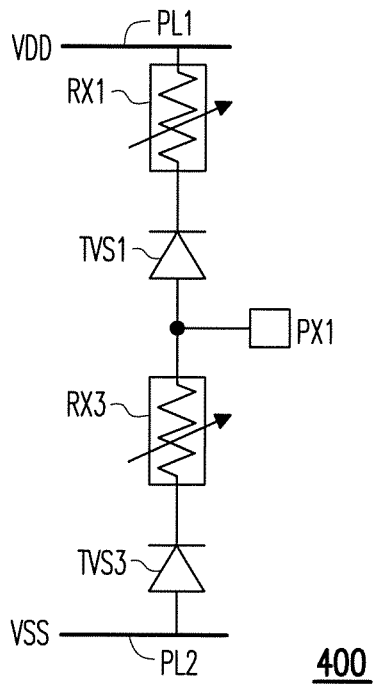
FIG. 4 is a schematic circuit diagram illustrating a system electrostatic discharge circuit according to a fourth embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic circuit diagram illustrating a system electrostatic discharge circuit according to a first embodiment of the invention. Referring to FIG. 1, a system electrostatic discharge circuit 100 includes a first transient voltage suppressor (TVS) diode TVS1 and a first resistance element RX1. A resistance value of the first resistance element RX1 is proportional to a sum of currents flowing through the first resistance element RX1. In addition, the system electrostatic discharge circuit 100 may be formed on any type of substrate, such as a printed circuit board (PCB), a flexible printed circuit (FPC), or the like. In addition, in the substrate, circuits (i.e., a plurality of electronic devices) having a plurality of different functions and a plurality of wirings (e.g., signal line, power line, or grounding line) for different purposes are disposed on the substrate in addition to the electrostatic discharge circuit 100. In addition, the circuits on the substrate are coupled to each other through the wirings to receive a signal or power as required. Here, for the ease of illustration, only the required part is shown. However, the embodiments of the invention shall not be limited thereto.

The first resistance element RX1 and the first transient voltage suppressor diode TVS1 are coupled in series between a first power line PL1 and a second power line PL2. In addition, the first power line PL1 receives a system high voltage VDD, and the second power line PL2 receives a system low voltage VSS. In other words, a cathode of the first transient voltage suppressor diode TVS1 is coupled to the first power line PL1 through the first resistance element RX1, and an anode of the first transient voltage suppressor diode TVS1 is directly coupled to the second power line PL2. In other words, the first transient voltage suppressor diode TVS1 is normally reversely biased and in an off state.

When a voltage difference between the system high voltage VDD and the system low voltage VSS is affected by noises and is greater than or equal to a breakdown voltage of the first transient voltage suppressor diode TVS1, the first transient voltage suppressor diode TVS1 may break down and be turned on, thereby accumulating the sum of currents flowing through the first resistance element RX1. Then, when the number of times of breakdown (or total time of breakdown) of the first transient voltage suppressor diode TVS1 exceeds a threshold number of times (or threshold time), the resistance value of the first resistance element RX1 may also be increased to a predetermined resistance value (i.e., resistance threshold).

Based on the above, by detecting the resistance value of the first resistance element RX1, the number of times of breakdown (or the total time of breakdown) of the first transient voltage suppressor diode TVS1 is roughly learned. Accordingly, whether the first transient voltage suppressor diode TVS1 is deteriorated may be determined, so as to determine whether to replace the first voltage suppressor diode TVS1. Hence, the safety of the system electrostatic discharge circuit 100 is facilitated.

FIG. 2 is a schematic circuit diagram illustrating a system electrostatic discharge circuit according to a second embodiment of the invention. Referring to FIGS. 1 and 2, in the embodiment, a system electrostatic discharge circuit 200 further includes a monitor circuit 210. In addition, similar or same components are referred to by similar or same reference symbols. The monitor circuit 210 is coupled to the first resistance element RX1 to detect the resistance value RR1 of the first resistance element RX1 and compare a resistance value RR1 of the first resistance element RX1 with the resistance threshold. When the resistance value RR1 of the first resistance element RX1 is greater than or equal to the resistance threshold, the monitor circuit 210 may transmit a warning message MGX1. When the resistance value RR1 of the first resistance element RX1 is less than the resistance threshold, the monitor circuit 210 does not transmit a signal.

In the embodiment, the warning message MGX1 may be a warning message provided to a control circuit in the substrate, a computing device, or the like. Alternatively, the warning message MGX1 may also be a sound signal, a light signal, or a text image. In addition, the sound signal, the light signal, or the text image may be converted through a corresponding circuit element, such as a speaker, a light emitting diode, or a display panel.

In addition, the monitor circuit 210 may include a comparator for comparing the resistance value RR1 of the first resistance element RX1 and the resistance threshold. Moreover, the monitor circuit 210 may firstly convert the resistance value RR1 of the first resistance element RX1 into a corresponding voltage level or current value for the comparator to make comparison. To be more specific, the monitor circuit 210 may further include a resistance-to-voltage converting circuit or a resistance-to-current converting circuit, depending on a circuit design.

FIG. 3 is a schematic circuit diagram illustrating a system electrostatic discharge circuit according to a third embodiment of the invention. Referring to FIGS. 1 and 3, in the embodiment, a system electrostatic discharge circuit 300 may further include a second transient voltage suppressor diode TVS2, a second resistance element RX2, a first switch SW1, a second switch SW2, and a monitor circuit 310. In addition, a second resistance value RR2 of the second resistance element RX2 is proportional to a sum of currents flowing through the second resistance element RX2.

The first resistance element RX1, the first transient voltage suppressor diode TVS1, and the first switch SW1 are coupled in series between the first power line PL1 and the second power line PL2. The second resistance element RX2, the second transient voltage suppressor diode TVS2, and the second switch SW2 are coupled in series between the first power line PL1 and the second power line PL2. The monitor circuit 310 is coupled to the first resistance element RX1, the second resistance element RX2, the first switch SW1, and the second switch SW2.

In the embodiment, the monitor circuit 310 may firstly turn on the first switch SW1. In other words, the first switch SW1 is turned on in default for the first transient voltage suppressor diode TVS1 to provide electrostatic discharge protection. Besides, the monitor circuit 310 may detect the resistance value RR1 of the first resistance element RX1 to determine whether the resistance value RR1 of the first resistance element RX1 is greater than or equal to the resistance threshold. When the first resistance value RR1 of the first resistance element RX1 is greater than or equal to the resistance threshold, the monitor circuit 310 turns off the first switch SW1 and turns on the second switch SW2 for the second transient voltage suppressor diode TVS2 to continuity provide electrostatic discharge protection.

Then, the monitor circuit 310 may detect the resistance value RR2 of the second resistance element RX2 to determine whether the resistance value RR2 of the second resistance element RX2 is greater than or equal to the resistance threshold. When the second resistance value RR2 of the second resistance element RX2 is greater than or equal to the resistance threshold (i.e., when both of the resistance value RR1 of the first resistance element RX1 and the resistance value RR2 of the second resistance element RX2 are greater than or equal to the resistance threshold), the monitor circuit 310 may turn on the first switch SW1 and the second switch SW2 together for the first transient voltage suppressor diode TVS1 and the second transient voltage suppressor diode TVS2 that are in deterioration to provide electrostatic discharge protection together and transmit a warning message MGX2.

The operation of the monitor circuit 310 may follow that the monitor circuit 210 of FIG. 2. However, the invention is not limited thereto.

FIG. 4 is a schematic circuit diagram illustrating a system electrostatic discharge circuit according to a fourth embodiment of the invention. Referring to FIGS. 1 and 4, in the embodiment, a system electrostatic discharge circuit 400 further includes a solder pad PX1, a third transient voltage suppressor diode TVS3, and a third resistance element RX3. In addition, similar or same components are referred to by similar or same reference symbols.

The first resistance element RX1 and the first transient voltage suppressor diode TVS1 are coupled in series between the first power line PL1 and the solder pad PX1. The third resistance element RX3 and the third transient voltage suppressor diode TVS3 are coupled in series between the solder pad PX1 and the second power line PL2. A resistance value of the third resistance element RX3 is proportional to a sum of currents flowing through the third resistance element RX3.

As in the embodiment of FIG. 1, by detecting the resistance value of the third resistance element RX3, whether the third transient voltage suppressor diode TVS3 is deteriorated may be determined, so as to determine whether to replace the third transient voltage suppressor diode TVS3.

Figure 5:
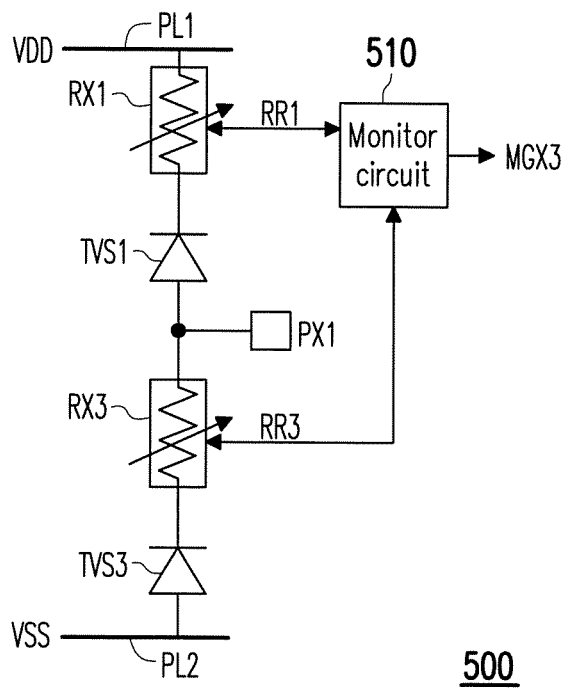
FIG. 5 is a schematic circuit diagram illustrating a system electrostatic discharge circuit according to a fifth embodiment of the invention.

FIG. 5 is a schematic circuit diagram illustrating a system electrostatic discharge circuit according to a fifth embodiment of the invention. Referring to FIGS. 4 and 5, in the embodiment, a system electrostatic discharge circuit 500 further includes a monitor circuit 510. In addition, similar or same components are referred to by similar or same reference symbols.

The monitor circuit 510 is coupled to the first resistance element RX1 and the third resistance element RX3 to detect the resistance value RR1 of the first resistance element RX1 and a resistance value RR3 of the third resistance element RX3 and compare the resistance value RR1 of the first resistance element RX1 and the resistance value RR3 of the third resistance element RX3 with the resistance threshold.

When at least one of the resistance value RR1 of the first resistance element RX1 and the resistance value RR3 of the third resistance element RX3 is greater than or equal to the resistance threshold, the monitor circuit 510 may transmit a warning message MGX3. When the resistance value RR1 of the first resistance element RX1 and the resistance value RR3 of the third resistance element RX3 are less than the resistance threshold, the monitor circuit 510 does not transmit a signal. The operation of the monitor circuit 510 may follow that the monitor circuit 210 of FIG. 2. However, the invention is not limited thereto.

Figure 6:
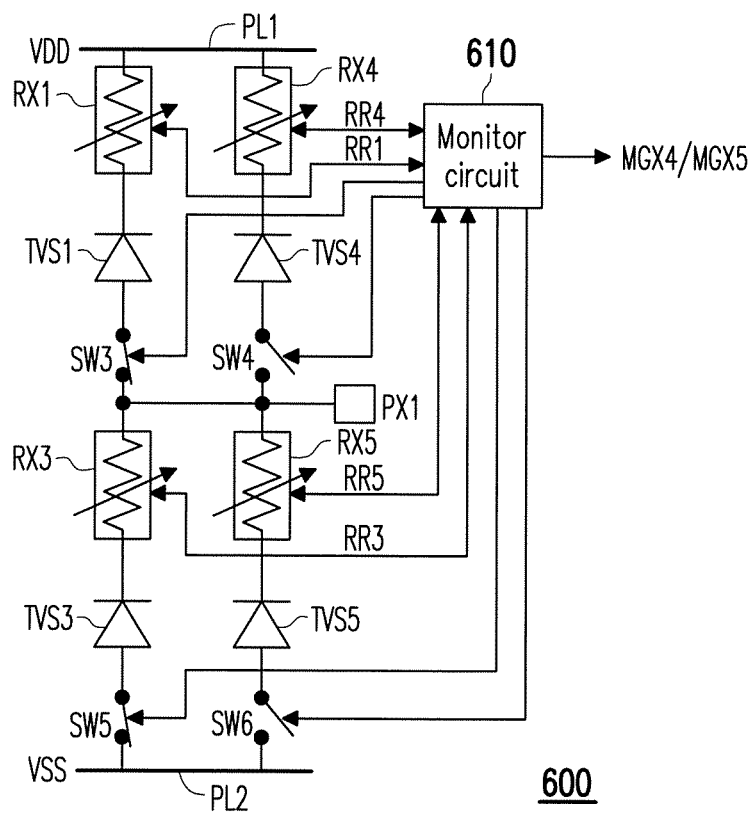
FIG. 6 is a schematic circuit diagram illustrating a system electrostatic discharge circuit according to a sixth embodiment of the invention.

FIG. 6 is a schematic circuit diagram illustrating a system electrostatic discharge circuit according to a sixth embodiment of the invention. Referring to FIGS. 4 and 6, in the embodiment, a system electrostatic discharge circuit 600 may further include a fourth transient voltage suppressor diode TVS4, a fourth resistance element RX4, a fifth transient voltage suppressor diode TVS5, a fifth resistance element RX5, a third switch SW3, a fourth switch SW4, a fifth switch SW5, a sixth switch SW6, and a monitor circuit 610. In addition, a resistance value RR4 of the fourth resistance element RX4 is proportional to a sum of currents flowing through the fourth resistance element RX4, and a resistance value RR5 of the fifth resistance element RX5 is proportional to a sum of currents flowing through the fifth resistance element RX5.

The first resistance element RX1, the first transient voltage suppressor diode TVS1, and the third switch SW3 are coupled in series between the first power line PL1 and the solder pad PX1. The fourth resistance element RX4, the fourth transient voltage suppressor diode TVS4, and the fourth switch SW4 are coupled in series between the first power line PL1 and the solder pad PX1.

The third resistance element RX3, the third transient voltage suppressor diode TVS3, and the fifth switch SW5 are coupled in series between the solder pad PX1 and the second power line PL2. The fifth resistance element RX5, the fifth transient voltage suppressor diode TVS5, and the sixth switch SW6 are coupled in series between the solder pad PX1 and the second power line PL2.

The monitor circuit 610 is coupled to the first resistance element RX1, the third resistance element RX3, the fourth resistance element RX4, the fifth resistance element RX5, the third switch SW3, the fourth switch SW4, the fifth switch SW5, and the sixth switch SW6.

In the embodiment, the monitor circuit 610 may firstly turn on the third switch SW3 and the fifth switch SW5. In other words, the third switch SW3 and the fifth switch SW5 are turned on in default for the first transient voltage suppressor diode TVS1 and the third transient voltage suppressor diode TVS3 to provide electrostatic discharge protection. Besides, the monitor circuit 610 may detect the resistance value RR1 of the first resistance element RX1 to determine whether the resistance value RR1 of the first resistance element RX1 is greater than or equal to the resistance threshold. When the first resistance value RR1 of the first resistance element RX1 is greater than or equal to the resistance threshold, the monitor circuit 610 turns off the third switch SW3 and turns on the fourth switch SW4 for the fourth transient voltage suppressor diode TVS4 to continuity provide electrostatic discharge protection.

Meanwhile, the monitor circuit 610 may detect the resistance value RR3 of the third resistance element RX3 to determine whether the resistance value RR3 of the third resistance element RX3 is greater than or equal to the resistance threshold. When the third resistance value RR3 of the third resistance element RX3 is greater than or equal to the resistance threshold, the monitor circuit 610 turns off the fifth switch SW5 and turns on the sixth switch SW6 for the fifth transient voltage suppressor diode TVS5 to provide electrostatic discharge protection.

Then, the monitor circuit 610 may detect the resistance value RR4 of the fourth resistance element RX4 to determine whether the resistance value RR4 of the fourth resistance element RX4 is greater than or equal to the resistance threshold. When the fourth resistance value RR4 of the fourth resistance element RX4 is greater than or equal to the resistance threshold (i.e., when both of the resistance value RR1 of the first resistance element RX1 and the resistance value RR4 of the fourth resistance element RX4 are greater than or equal to the resistance threshold), the monitor circuit 610 may turn on the third switch SW3 and the fourth switch SW4 together for the first transient voltage suppressor diode TVS1 and the fourth transient voltage suppressor diode TVS4 that are in deterioration to provide electrostatic discharge protection together and transmit a warning message MGX4 (corresponding to a first warning message).

Besides, the monitor circuit 610 may detect the resistance value RR5 of the fifth resistance element RX5 to determine whether the resistance value RR5 of the fifth resistance element RX5 is greater than or equal to the resistance threshold. When the fifth resistance value RR5 of the fifth resistance element RX5 is greater than or equal to the resistance threshold (i.e., when both of the resistance value RR3 of the third resistance element RX3 and the resistance value RR5 of the fifth resistance element RX5 are greater than or equal to the resistance threshold), the monitor circuit 610 may turn on the fifth switch SW5 and the sixth switch SW6 together for the third transient voltage suppressor diode TVS3 and the fifth transient voltage suppressor diode TVS5 that are in deterioration to provide electrostatic discharge protection together and transmit a warning message MGX5 (corresponding to a second warning message).

The operation of the monitor circuit 610 may follow that the monitor circuit 210 of FIG. 2. However, the invention is not limited thereto.

In view of the foregoing, in the system electrostatic discharge circuit according to the embodiments of the invention, since the resistance value of the first resistance element reflects the sum of currents of the first resistance element, the number of times of breakdown (or the total time of breakdown) of the first transient voltage suppressor diode can be learned, so as to determine whether the first transient voltage suppressor diode needs to be replaced. Hence, the safety of the system electrostatic discharge circuit is facilitated. Besides, the warning message may be provided by using the monitor circuit to compare the resistance value of the first resistance element and the resistance threshold, so as to actively inform the state of the first transient voltage suppressor diode. Moreover, the second transient voltage suppressor diode, the second resistance element, the first switch, and the second switch may be disposed. The second resistance element is used for inspecting the state of the second transient voltage suppressor diode, and the first switch and the second switch control whether the first transient voltage suppressor diode and the second transient voltage suppressor diode provide the electrostatic discharge protection.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system electrostatic discharge circuit, comprising:
    a first transient voltage suppressor diode;
    a first resistance element, coupled with the first transient voltage suppressor diode in series between a first power line and a second power line, wherein a resistance value of the first resistance element is proportional to a sum of currents flowing through the first resistance element; and
    a monitor circuit coupled to the first resistance element to detect a resistance value of the first resistance element and transmit a warning message when the resistance value of the first resistance element is greater than or equal to a resistance threshold.

2. The system electrostatic discharge circuit as claimed in claim 1, further comprising:
    a second transient voltage suppressor diode;
    a second resistance element, coupled with the second transient voltage suppressor diode in series between the first power line and the second power line, wherein a resistance value of the second resistance element is proportional to a sum of currents flowing through the second resistance element;
    a first switch, coupled with the first resistance element and the first transient voltage suppressor diode in series between the first power line and the second power line;
    a second switch, coupled with the second resistance element and the second transient voltage suppressor diode in series between the first power line and the second power line; and
    a monitor circuit, coupled to the first resistance element, the second resistance element, the first switch, and the second switch to turn on the first switch and detect resistance values of the first resistance element and the second resistance element, wherein when the resistance value of the first resistance element is greater than or equal to a resistance threshold, the first switch is turned off and the second switch is turned on.

3. The system electrostatic discharge circuit as claimed in claim 2, wherein when the resistance values of the first resistance element and the second resistance element are greater than or equal to the resistance threshold, a warning message is transmitted.

4. The system electrostatic discharge circuit as claimed in claim 1, further comprising:
    a solder pad, wherein the first resistance element and the first transient voltage suppressor diode are coupled in series between the first power line and the solder pad;
    a third transient voltage suppressor diode; and
    a third resistance element, coupled with the third transient voltage suppressor diode in series between the solder pad and the second power line, wherein a resistance value of the third resistance element is proportional to a sum of currents flowing through the third resistance element.

5. The system electrostatic discharge circuit as claimed in claim 4, further comprising a monitor circuit coupled to the first resistance element and the third resistance element to detect resistance values of the first resistance element and the third resistance element and transmit a warning message when the resistance value of at least one of the first resistance element and the third resistance element is greater than or equal to a resistance threshold.

6. The system electrostatic discharge circuit as claimed in claim 4, further comprising:
    a fourth transient voltage suppressor diode;
    a fourth resistance element, coupled with the fourth transient voltage suppressor diode in series between the first power line and the solder pad, wherein a resistance value of the fourth resistance element is proportional to a sum of currents flowing through the fourth resistance element;
    a fifth transient voltage suppressor diode;
    a fifth resistance element, coupled with the fifth transient voltage suppressor diode in series between the solder pad and the second power line, wherein a resistance value of the fifth resistance element is proportional to a sum of currents flowing through the fifth resistance element;
    a third switch, coupled with the first resistance element and the first transient voltage suppressor diode in series between the first power line and the solder pad;
    a fourth switch, coupled with the fourth resistance element and the fourth transient voltage suppressor diode in series between the first power line and the solder pad;
    a fifth switch, coupled with the third resistance element and the third transient voltage suppressor diode in series between the solder pad and the second power line;
    a sixth switch, coupled with the fifth resistance element and the fifth transient voltage suppressor diode in series between the solder pad and the second power line; and
    a monitor circuit, coupled to the first resistance element, the third resistance element, the fourth resistance element, the fifth resistance element, the third switch, the fourth switch, the fifth switch, and the sixth switch to turn on the third switch and the fifth switch and detect resistance values of the first resistance element and the third resistance element, wherein when the resistance value of the first resistance element is greater than or equal to a resistance threshold, the third switch is turned off and the fourth switch is turned on, and when the resistance value of the third resistance element is greater than or equal to the resistance threshold, the fifth switch is turned off and the sixth switch is turned on.

7. The system electrostatic discharge circuit as claimed in claim 6, wherein when the resistance values of the first resistance element and the fourth resistance element are greater than or equal to the resistance threshold, a first warning message is transmitted, and when the resistance values of the third resistance element and the fifth resistance element are greater than or equal to the resistance threshold, a second warning message is transmitted.

* * * * *